F. PISTEK & J. HEJL.
PLOW CULTIVATOR.
APPLICATION FILED SEPT. 15, 1915.
1,172,553.
Patented Feb. 22, 1916.
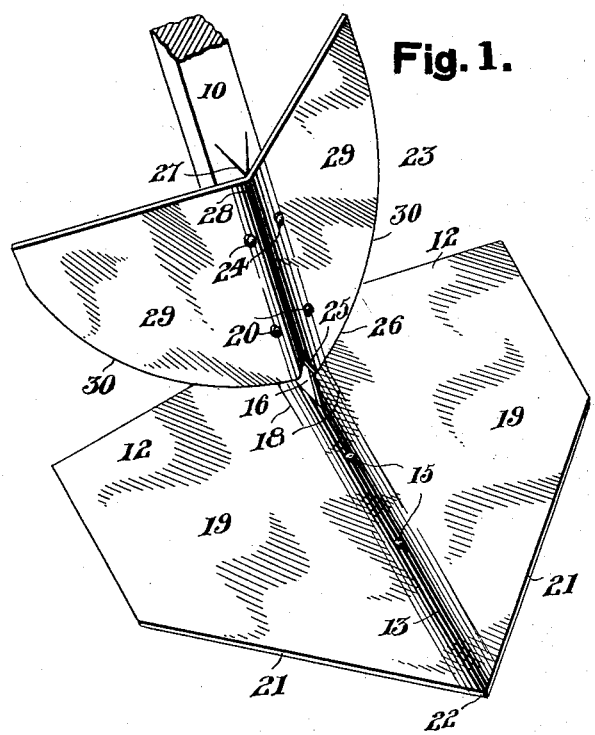
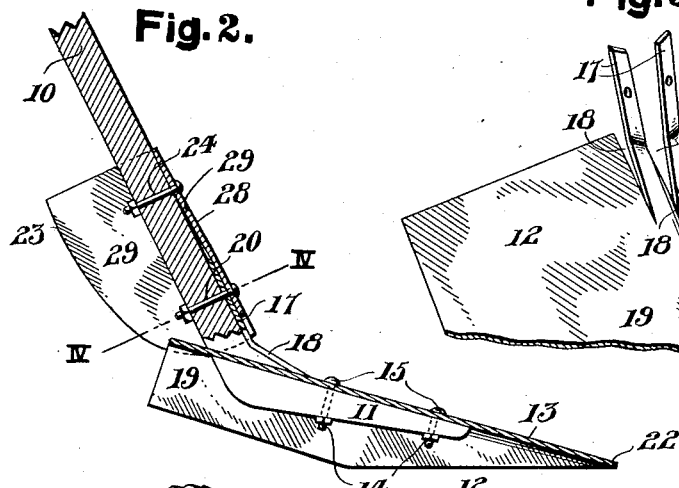
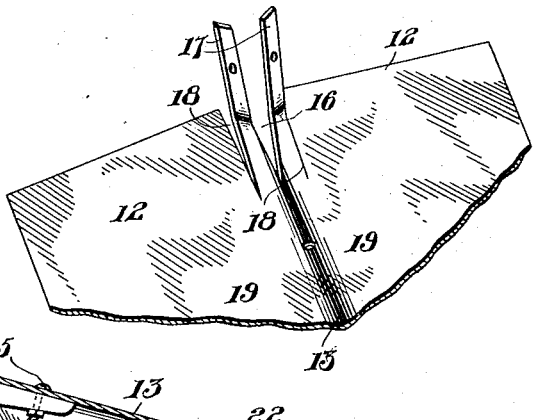
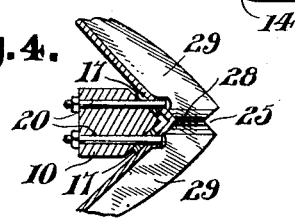
Inventors
F. Pistek
J. Hejl
By A. M. Wilson,
Attorney.
THE COLUMBIA PLANOGRAPH CO., WASHINGTON, D. C.

UNITED STATES PATENT OFFICE.

FRENK PISTEK AND JAMES HEJL, OF OVID, MICHIGAN.

PLOW-CULTIVATOR.

1,172,553.  Specification of Letters Patent.  Patented Feb. 22, 1916.

Application filed September 15, 1915. Serial No. 50,803.

*To all whom it may concern:*

Be it known that we, FRENK PISTEK and JAMES HEJL, subjects of the Emperor of Austria-Hungary, residing at Ovid, in the county of Clinton and State of Michigan, have invented certain new and useful Improvements in Plow-Cultivators, of which the following is a specification.

This invention relates to certain new and useful improvements in plow cultivators.

The primary object of the invention is the provision of a plow more especially of the form designed for operation in cultivating and adapted to present a yielding shovel blade in connection with a winged spreading blade.

A further object of the device is the provision of a plurality of removable cultivator blades operatively united together each of the same having adjacent overlapping portions and slightly flexible winged blades.

With these general objects in view and others that will appear as the nature of the invention is better understood, the same consists in the novel combination and arragement of parts hereinafter more fully described, illustrated in the accompanying drawings and pointed out in the appended claim.

In the drawings forming a part of this application and in which like-designating characters refer to corresponding parts throughout the several views:—Figure 1 is a perspective view of the device. Fig. 2 is a central longitudinal sectional view thereof. Fig. 3 is a perspective view of the upper portion of the main blade detached, and Fig. 4 is a sectional view taken upon line IV—IV of Fig. 2.

Referring more in detail to the drawings, an angular supporting bar 10 is illustrated, it being understood that the same is designed to be supported by the beam (not shown) of the plow or cultivator. The said supporting bar has its lower angular end 11 adapted for mounting the main blade or double mold board 12 thereon. The said blade 12 is seated upon the bar extension 11 at its central longitudinal bent portion 13 and is secured by means of two bolts 14 suitably spaced apart and extending through perforations 15 in the said plate 12 and through the bar extension 11. The said plate 12 is provided with a V-shaped incision 16 at its rear portion and is formed with rearwardly projecting straps 17 one at each side of the said incision, while the rear portion of the blade is provided with slits 18 at the outer sides of the straps 17, these slits extending inwardly of the blade to a distance slightly greater than the incision 16. By this arrangement the equal opposite sides or wings 19 of the blade 12 are rendered slightly resilient so that when mounted in the manner above described with the straps 17 secured to the upright portion of the bar 10 by means of bolts 20 the wings 19 will be so mounted as to slightly yield when coming in contact with obstacles such as stones and roots during the operation of the device and thus preventing a breaking of the blade. The forward end of the plate 12 is provided with oblique edges 21 terminating in a forward point 22 at the termination of the central blade portion 13.

A mold board member 23 is secured to the bar 10 by means of bolts 24 and the aforementioned strap bolts 20, the said member 23 being thus secured overlying the said straps 17. An opening 25 is provided at the lower overlying edge 26 of the mold board 23 and is positioned adjacent the incision 16 of the blade 12 and thus forming a four-sided opening through the combined blades.

The bar 10 has a rib 27 upon its forward side substantially V-shaped in cross section and the centrally bent portion 28 of the mold board is secured over the said rib, the straps 17 underlying the said mold board and one of the same engaging each side of the said rib 27. The mold board is thus provided with opposite equal portions or wings 29.

From this detailed description of the device it will thus be seen that both the mold board 29 and the blade 12 are removable from the mounting bar 10 and that the securing of the mold board over the straps 17 retains the blade 12 secured at opposite sides of its central attaching portion 13 and thus allows the rear portions of the blade wings 19 to slightly vibrate or give during the passing of the blade through the soil, while the said blade is thus sufficiently securely mounted to the supporting bar 10 for practical purposes of operation. While the blade 12 is flexible and yielding, the mold board 23 is more rigid for withstanding the contact with the soil and is firmly attached to the supporting bar 10 and thus acts as a spreader for the material which is dug up by the pointed slightly inclined blade 12 in advance thereof. The outer edges 30 of the mold board are substantially semi-circular in form and approach the forward notch 25 thereof and engage the rear portions of the upper faces of the blade wings 19.

While the form of the invention herein shown and described is what is believed to be the preferred embodiment thereof, it is nevertheless to be understood that minor changes may be made without departing from the spirit and scope of the invention as set forth in the claim.

What we claim as new is:—

A plow construction comprising a supporting beam having a lower angular extension, the said beam having a forwardly projecting longitudinal V-shaped rib, a blade having a pointed forward end and having its longitudinal central portion seated upon the said extension, the said blade being formed of flexible material and having a centrally positioned incision at its rear end and opposite slots forming spaced retaining straps flatly engaging the opposite sides of the said bar rib, a mold board formed of relatively non-flexible material and having a centrally bent portion contacting the said bar rib, overlying the said straps, and removable bolts extending through the said bar and the said straps and mold board when the opposite curved edges of the mold board are operatively positioned adjacent the opposite rear portion of the said blade.

In testimony whereof we affix our signatures.

FRENK PISTEK.
JAMES HEJL.

Copies of this patent may be obtained for five cents each, by addressing the "Commissioner of Patents, Washington, D. C."